United States Patent [19]

Frommlet et al.

[11] 4,360,337

[45] Nov. 23, 1982

[54] DAMPING DEVICE FOR A HELICOPTER ROTOR BLADE

[75] Inventors: Hubert Frommlet, Siegertsbrunn; Ludwig Stangl, Garching, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 175,022

[22] Filed: Aug. 4, 1980

[30] Foreign Application Priority Data

Aug. 10, 1979 [DE] Fed. Rep. of Germany ....... 2932441

[51] Int. Cl.³ .............................................. B64C 27/35
[52] U.S. Cl. ............................. 416/141; 416/134 A; 416/138
[58] Field of Search .......... 416/134 A, 138 A, 140 A, 416/141

[56] References Cited

U.S. PATENT DOCUMENTS

| 3,879,153 | 4/1975 | Breuner | 416/138 A X |
| 3,880,551 | 4/1975 | Kisorec | 416/138 A X |
| 4,008,980 | 2/1977 | Noehren et al. | 416/138 A X |
| 4,111,605 | 9/1978 | Roman et al. | 416/138 A X |
| 4,201,515 | 5/1980 | Derschmidt et al. | 416/138 A |
| 4,266,912 | 5/1981 | Roman | 416/141 |

FOREIGN PATENT DOCUMENTS 52-64797  5/1977  Japan ................. 416/134 A

*Primary Examiner*—Everette A. Powell, Jr.
*Attorney, Agent, or Firm*—W. G. Fasse; D. F. Gould

[57] ABSTRACT

The wing blades of a helicopter rotor each are connected to the rotor hub by a connection, e.g. a spar being →←— including a hinge which is at least fictitious to permit lead-lag movements of the blades <yielding relative to torsion to permit the blade angle adjustment>. A rod, which is stiff in the lead-lag direction and yielding against torsion, is connected in parallel to the connection between the blade root and the rotor hub. One connection of the rod is rigid, for example the connection to the blade root. The other connection of the rod is elastically yielding substantially only in the plane of the rotor whereby a substantial damping of blade movements in the lead-lag direction is accomplished.

14 Claims, 1 Drawing Figure

U.S. Patent  Nov. 23, 1982  4,360,337
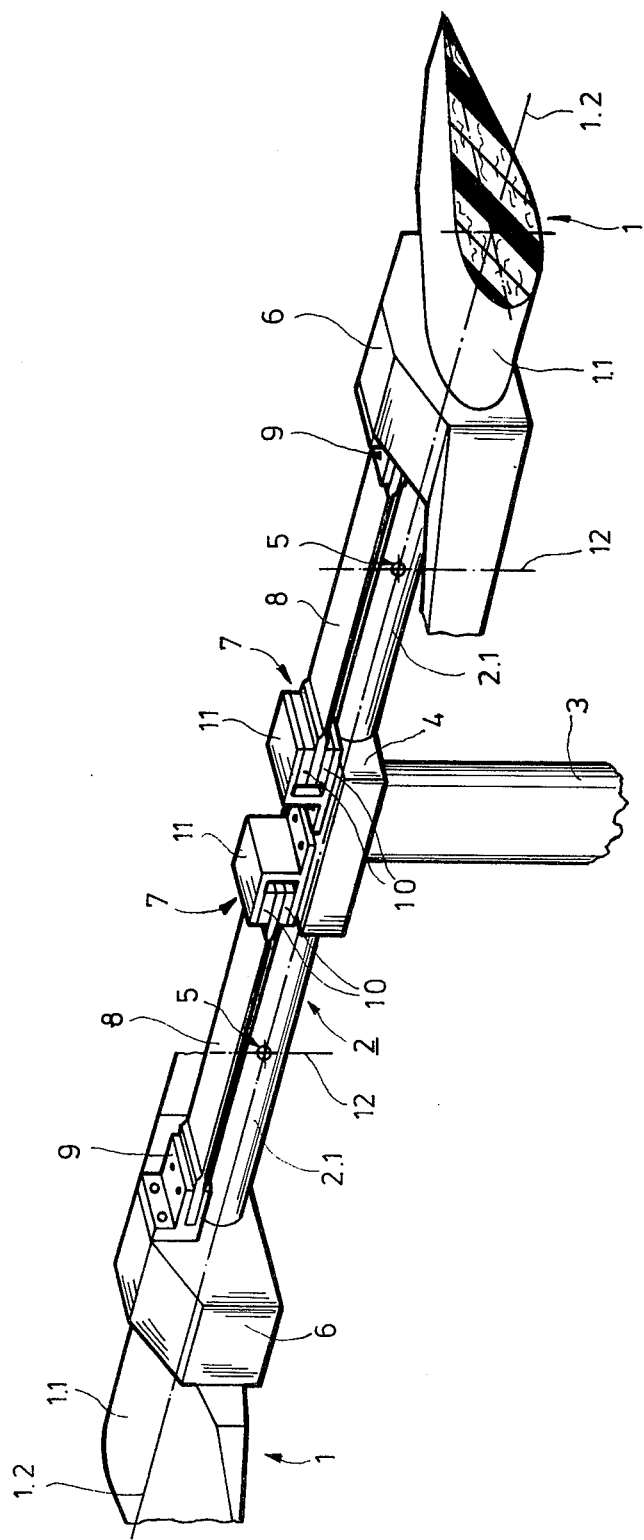

DAMPING DEVICE FOR A HELICOPTER ROTOR BLADE

BACKGROUND OF THE INVENTION

The present invention relates to a damping device for a rotor blade, particularly for a helicopter rotor. Such blades are capable of vibrating. Further, the connection between the rotor hub or rotor head and the blade root permits the adjustment of blade angle movements. A blade angle movement adjustment lever is also connected to the respective blade root. Hinges at least of the fictive type are located between the blade angle adjustment lever and the rotor head to permit the so-called lead-lag movements of the blade.

The rotor blades in so-called lead-lag soft rotors have a tendency to vibrate in a non-stable manner during start-up and coasting or slow-down. In order to reach, for example, the operational r.p.m. of the rotor it is necessary to pass the range of rotor r.p.m.s in which the rotational rotor frequency corresponds to the blade resonance frequency in the lead-lag direction of the blades (resonance condition). Thus, in this critical rotor r.p.m. range the resulting ground resonance due to an insufficient damping of the lead-lag movements in the rotor itself or in the connecting structure of the rotor may cause destructions not only to the rotor but also in the aircraft frame.

OBJECTS OF THE INVENTION

In view of the foregoing it is the aim of the invention to achieve the following objects singly or in combination:

to provide a damping apparatus or device for the individual rotor blades, particularly in a rotor which is "soft" or yielding in the lead-lag direction, which damping device avoids such resonance conditions without impairing the aero-elastic characteristic of the rotor which is required for its proper operation;

to construct the damping mechanism in such a manner that it is subject substantially exclusively to shearing loads in the lead-lag direction;

to connect a damping rod in parallel to the blade connecting means (e.g. spar) in such a manner that the damping rod can perform movements only in a plane extending in parallel to the plane of rotation of the rotor; and to keep the damping rod substantially free of centrifugal forces so that it is not exposed to any reversely effective torque moments.

SUMMARY OF THE INVENTION

According to the invention there is provided a damping mechanism for a rotor such as a helicopter rotor wherein a damping rod is interposed between the blade root or the blade angle adjustment lever support and the rotor head. The damping rod is relatively yielding to torque moments about its longitudinal axis but stiff against bending in the lead-lag direction. First securing means connect the radially outer end of the damping rod to the blade root or to said blade angle adjustment lever support. A second securing means connects the radially inner end of the damping rod to the rotor hub or rotor head. One of the securing means is rigid whereas the other of the securing means comprise elastically yielding means having a high damping capacity to permit movements of the rod substantially only in the plane of rotation of the rotor. Preferably, the damping rod extends substantially in parallel to the longitudinal, radial axis of the respective rotor blade and the elastically yielding means comprise elastomeric layers.

The damping rod in its just described position thus bridges the blade hinge which may be of the fictive or mechanical kind. The elastical connection may be provided either between the radially inner end of the rod and the rotor hub or head or it may be provided between the radially outer end of the rod and the blade root or blade angle adjustment lever support. Thus, the rod acts as a lever in response to a bending of the blade connecting spar in the lead-lag direction. The resulting motion relative to the blade connection causes a shearing deformation of the elastically yielding securing means. During such elastic deformation the rod is effective as a double or two-armed lever, the rotational axis of which is the lead-lag axis. Thus, the size of the shearing deformation or of the resulting damping force of the elastically yielding securing means which are preferably made of elastomeric materials, is primarily determined by the spacing of the elastic securing means from the lead-lag axis. This spacing is easily changeable, particularly if the securing means adjacent to the rotor hub are of the elastically yielding kind to thereby achieve a higher shearing deformation. Therefore, it is possible according to the invention to achieve a high degree of damping even in response to relatively small bending in the lead-lag direction of the blade connection.

BRIEF FIGURE DESCRIPTION

In order that the invention may be clearly understood, it will now be described, by way of example, with reference to the single FIGURE of the accompanying drawing which is a perspective illustration of the present damping mechansim as used, for example, in a two-blade rotor.

DETAILED DESCRIPTION OF PREFERRED EXAMPLE EMBODIMENTS AND OF THE BEST MODE OF THE INVENTION

The single FIGURE shows, for example, a tail rotor of a helicopter. The blade means 1 comprise two blades 1.1 proper arranged diametrically opposite each other relative to the rotor head or hub 4 carried by a drive shaft or rotor mast 3. The rotor blades 1.1 have a common longitudinally, radially extending axis 1.2. Only the radially inner ends of the blades 1.1 are shown for simplicity's sake. The blades 1.1 may, for example, be made of fiber reinforced synthetic material, whereby the fiber strands extend in the longitudinal direction as defined by the axis 1.2. These fiber strands extend from a blade or wing tip of one rotor blade all the way to the blade tip of the other rotor blade. In the zone between the blade roots to which the blade angle lever supports 6 are secured, the fibers form a common single piece spar member 2 extending uninterrupted from one blade root to the other or rather from one blade angle adjustment lever support 6 to the other. The spar portions 2.1 are operatively connected to the rotor head or hub 4 by conventional means.

German Patent Publication (DE-OS) No. 2,701,519 discloses such a rotor blade pair in which the common spar member 2 forms a connection between the rotor blades 1.1 and the rotor hub 4 which connection is yielding to torsion loads in the blade angle adjustment direction as well as yielding to bending loads in the lead-lag direction of the blades. Thus, a fictive hinge is provided and separate mechanism hinges are not necessary for accommodating the lead-lag movements of the blade nor for accommodating the blade flapping movement. A fictive hinge 5 is provided in each spar section 2.1. Such fictive hinges are symbolically indicated by the small circle 5. A fictive hinge to accommodate blade flapping movements may be visualized as being located between the fictive blade lead-lag hinge 5 and the rotor hub on both sides thereof.

It is also possible to interconnect the two rotor blades 1.1 by separate spar sections 2.1, each providing a respective separate connection which is yielding relative to torsion and bending. In an alternate embodiment it is possible to provide conventional blade angle bearings between the hub 4 and the blades and to use separate flapping hinges as well as lead-lag hinges.

In any of these possible connections between the rotor blades and the hub a blade angle adjustment lever support 6 will be rigidly secured to the respective blade root so that no slipping will be possible between the support 6 and the respective blade 1.1.

First securing means 9 connect the damping rod 8 to the blade root or rather to the support 6. Second securing means 7 connect the damping rod 8 to the hub 4. For example, the second securing means 7 constitute simultaneously a damping mechanism due to the insertion of elastomeric layers 10 in a fork type bracket 11 for securing the radially inner end of the rod 8. The elastomeric layers 10 are connected, for example, by suitable adhesives in a form-locking, force transmitting manner to the inner surfaces of the fork bracket 11 and to the outer surfaces of a thickened end portion of the rod 8. Thus, an effective damping of the lead-lag movements is provided by the elastomeric layers 10 of the securing means 7, whereby any non-stable vibratory states of the rotor are substantially eliminated.

The rod 8 is preferably a leaf spring which is relatively yielding against torsion loads about its longitudinal axis. However, the rod 8 is stiff against bending in a plane extending parallel to the rotational plane in which the longitudinal axis 1.2 extends. The rod 8 arranged in parallel to the rotational plane of the rotor may, for example, be made of fiber reinforced synthetic material.

The spacing between the rod 8 and the adjacent spar section 2.1 should be minimized in order not to limit the flapping movements and the blade angle adjustment movements of the blade. Such spacing should be in the order of a few millimeters, for example The first securing means 9 also comprise a forked bracket rigidly connected to the support 6 and to the radially outer, also thickened end of the rod 8. The forked bracket 9 may be bolted to the support 6. The forked bracket 11 may be bolted to the rotor hub or head 4. Rather than providing an adhesive connection between the elastomeric layers 10 and the bracket 11, as well as the rod 8, such form-locking, force transmitting connections may also be accomplished by a vulcanization process. If desired or required several elastomeric layers 10 may be employed and metallic layers may be interposed between adjacent elastomeric layers. Silicon materials, polyurethane, or layers of rubber or rubber mixtures have been found suitable for the present purpose.

Locating the second securing means 7, 11 at or on the rotor hub 4 is preferable to locating the second securing means which constitute the damping mechanism on the support 6. However, the latter possibility is also quite satisfactory although the first mentioned and illustrated embodiment reduces the blade mass and thus any possible strength problems of the blade connection.

As mentioned above each end of the rod 8 has a thickened end which makes the rod stiff against bending only at these ends in all directions. This thickening of the rod ends has the advantage that in the elastic connection comprising the elements 10 and 11 adjacent to the rotor hub 4 any possible movements of the rod 8 in the elastomeric layers 10 causes shearing loads exclusively.

Due to the rigid connection of the rod 8 to the support 6 in a force and torque transmitting manner and due to the elastically yielding connection to the rotor hub 4 permitting only a movement in parallel to the longitudinal direction of the blade and in the lead-lag direction, the movements of the rod 8 are limited to a plane extending in parallel to the plane of rotation of the rotor. The movement in parallel to the longitudinal axis 1.2 of the blades by the rod 8 has the advantage that the rod 8 is free of centrifugal forces thereby avoiding any reactive torque moments that could result from centrifugal forces. Due to these defined movements which the rod 8 may perform it cooperates with the elastomeric layers 10 to act as a highly effective damping mechanism for vibration amplitudes in the lead-lag direction whereby the lever corresponding to the spacing of the securing means 7 from the lead-lag axis 5 functions as a leverage in the shearing deformation of the damping material of the elastomeric layers 10. Depending on the selected force transmission or leverage the overall stiffness of the damping device may be so selected that the blade lead-lag frequency is influenced only to a negligible extent by the damping of the vibration amplitudes.

Incidentally, the rod 8 may be made of fiber strands branched off from the fiber strands used to make the spar 2. Thus, the rod 8 may be an integral component of the respective spar section 2.1 and thus of the rotor blade 1. Hence, the extra costs for the damping mechanism are kept to a minimum.

Although the invention has been described with reference to specific example embodiments, it will be appreciated, that it is intended to cover all modifications and equivalents within the scope of the appended claims.

What is claimed is:

1. An apparatus for damping blade vibrations in the lead-lag direction of the blades of a helicopter rotor, comprising rotor head means and, at least one blade including a blade root, means operatively connecting said blade root to said rotor head means, said connecting means permitting blade angle movements and said blade vibrations, said connecting means including hinge means for permitting lead-lag movements of the blade, torsionally yielding rod means stiff against bending in the lead-lag direction, first securing means operatively connecting said rod means to said blade root means, second securing means operatively connecting said rod means to said rotor head means, one of said first or second securing means providing a substantially rigid connection, the other of said first or second securing means comprising elastic means arranged so as to permit elastically yielding movements of said rod means substantially only in the lead-lag direction for substantially damping vibrations of the respective blade in the lead-lag direction in the plane of rotation of said rotor.

2. The apparatus of claim 1, wherein said hinge means are at least fictive hinge means.

3. The apparatus of claim 1, wherein said blades have a radial, longitudinal axis, said rod means extending substantially in parallel to said radial longitudinal axis.

4. The apparatus of claim 1 or 3, wherein said other securing means comprising said elastic means is arranged to connect said rod means to said rotor head means.

5. The apparatus of claim 1 or 3, wherein said elastic means comprise elastomeric means.

6. The apparatus of claim 1, wherein said rod means comprise a leaf spring arranged to extend substantially in parallel to said plane of rotation of said rotor.

7. The apparatus of claim 6, wherein said elastic means comprise elastomeric means forming a layer on said leaf spring at one end thereof at least on one side of the leaf spring.

8. The apparatus of claim 7, wherein said layer of elastomeric means extends across the width of said leaf spring at said one end of the leaf spring.

9. The apparatus of claim 7, further comprising stiffening means forming an operative part of said leaf spring at least at one end thereof where said elastomeric means are located.

10. The apparatus of claim 9, wherein said stiffening means form an operative part of said leaf spring at both ends of said leaf spring.

11. The apparatus of claim 7, wherein said elastomeric means form a layer on both sides of said leaf spring at said one end thereof, said other securing means comprising fork means, said layers of elastomeric means and said one end of said leaf spring being operatively held in said fork means.

12. The apparatus of claim 11, further comprising a form-locking force transmitting connection between said leaf spring and said elastomeric layers, and between said fork means and said elastomeric layers.

13. The appartus of claim 1, wherein said spar means are made of fiber compound material and wherein said rod means are made of fibers of said fiber compound material which are branched out of said spar means.

14. The apparatus of claim 1, further comprising blade angle adjustment means operatively secured to the respective blade root, said first securing means comprising bracket means connected to said blade angle adjustment means.

* * * * *